Mar. 6, 1923.

G. W. MASCORD.
CONVEYER.
FILED AUG. 24, 1920.

Inventor
George William Mascord
by
W. E. Evans
Attorney.

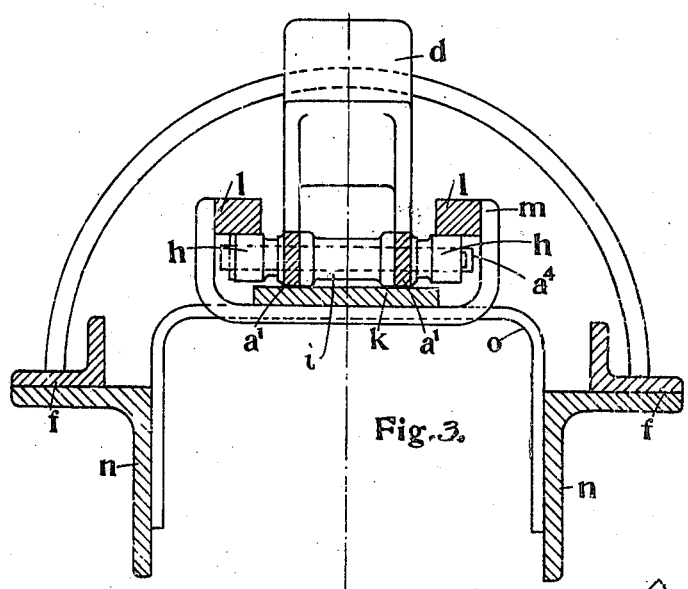
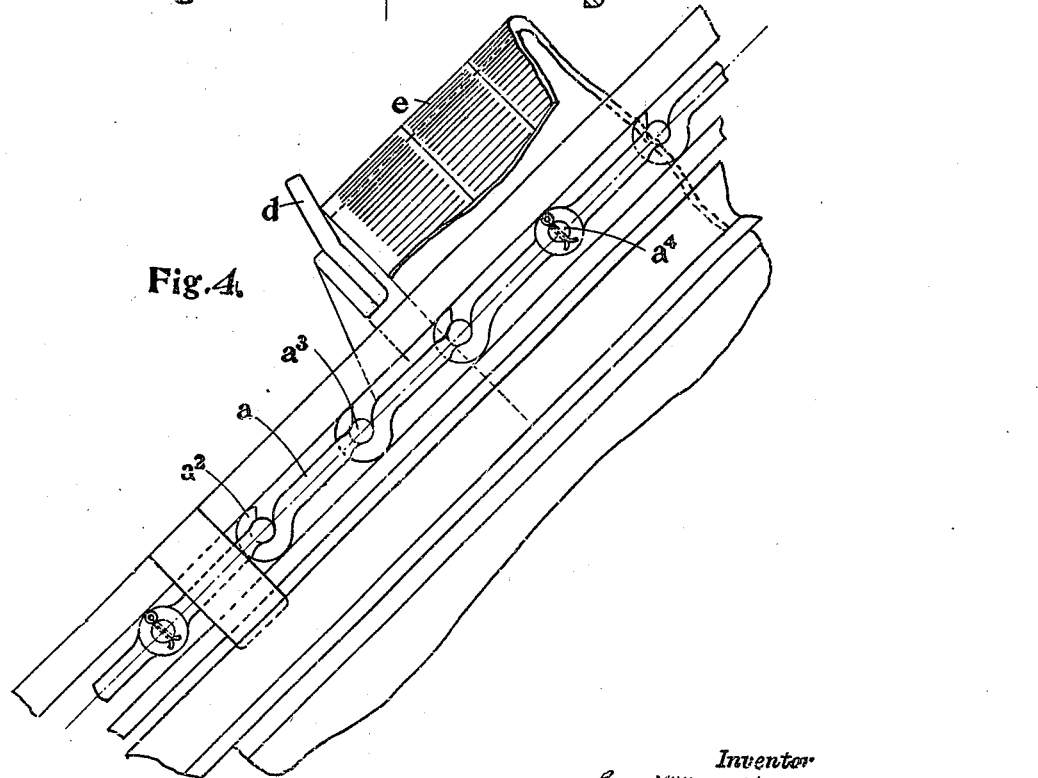

Patented Mar. 6, 1923.

1,447,423

UNITED STATES PATENT OFFICE.

GEORGE WILLIAM MASCORD, OF LONDON, ENGLAND.

CONVEYER.

Application filed August 24, 1920. Serial No. 405,725.

*To all whom it may concern:*

Be it known that I, GEORGE WILLIAM MASCORD, a subject of the King of Great Britain and Ireland, residing at St. Agnes's, 14 Castelnau, Barnes, London, S.W. 13, England, have invented certain new and useful Improvements Relating to Conveyers, (for which I have filed an application in England, No. 13,396 dated May 27, 1919,) of which the following is a specification.

This invention relates to conveyer apparatus as used more especially in the conveyance of curved stereotype plates, such as used in rotary printing machines, from one point to another and comprising an endless conveyer co-operating with a suitable guide-way for the plates.

The invention has for its object to provide simple and effective means for the pur pose more particularly for conveyance of the plates from one plane to another and over considerable distances, as, for example, from the stereotype department or shop where they are produced to the printing press, so as to avoid the lifting of the plates or their conveyance on trucks.

According to the invention guide-ways are provided along which the stereotype plates are caused to slide on their respective longitudinal edges, the guide-ways being set between the loading and delivery points and being of a shape, disposition and inclination depending upon the differences of level and position between these points, and which may be modified to avoid any obstacle such as walls or girders that may be encountered. Between these guide-ways an endless conveyer chain or belt is mounted to move and is provided with means for engaging the plates or articles to be conveyed. These means may take any suitable form such as upstanding contact arms or members mounted at intervals upon the conveyer and adapted to engage the plate or the article to be conveyed at the rear. These contact arms are mounted at such distance apart as to allow ample space for the stereotype plate to be placed in position in the guide-ways without liability of the plate fouling the succeeding contact arm.

It will be understood that the guide-ways may be provided with a curvature according to the particular requirements of the case and in such event means may be employed to compel the conveyer to take a course exactly corresponding to the curved shape of the guide-ways. This may be conveniently done by providing a guide or former on each side of the conveyer to engage its respective edges, the guides or formers being disposed beneath or above the edges of the conveyer according as to whether the curvature is convex or concave in outline. These guides for the endless conveyer it will be understood will have a shape generally conforming to that of the guide-ways so that thus the conveyer in its movement will maintain its position with respect to the stereotype plates whether being moved upward or downward, as it will be understood that when the upper part of the conveyer chain or belt becomes in tension, it will act in line. Thus the same curve or form is retained upward as well as downward.

The invention is illustrated in the accompanying drawings in which—

Figure 3 is a transverse section on an enlarged scale through the conveyer in a plane adjacent to one of the contact members.

Figure 4 is a detail elevation also on an enlarged scale.

Figure 2:
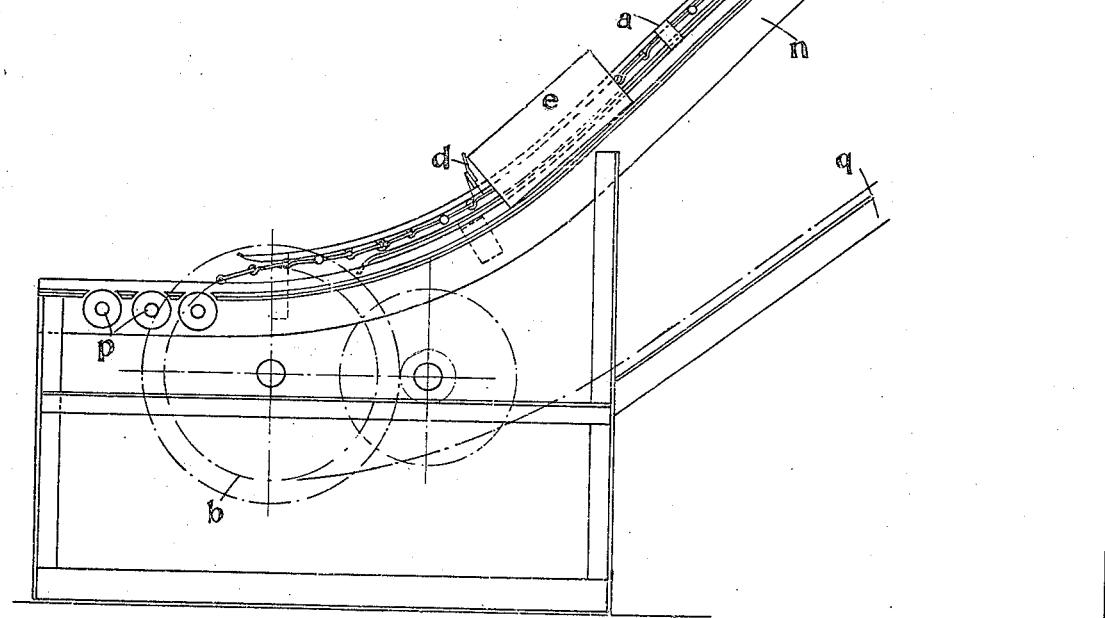

In carrying the invention into effect as illustrated in the accompanying drawings in the provision of a conveyer for moving the plates from one position to another position at a distance away from and above the first, I may provide the endless conveyer $a$ of any known form as a flexible belt of canvas or other similar material or as illustrated in the drawings in the form of a chain and I mount this endless conveyer upon a driving or chain wheel $b$ at the position at which the plates are to be loaded, and I impart movement to the spindle of this driving or chain wheel $b$ advantageously from an electric-motor through reducing gear. At the delivery point I may provide a guide wheel or wheels $c$ over which the conveyer $a$ may pass. I mount upon the conveyer at intervals a series of contact arms such as $d$ which are disposed perpendicular to the conveyer and are of such height and disposition as to come into contact with the rear of the stereotype plate $e$ on its being mounted in position in the guide ways $f$. It will be understood that a pair of fixed guide-ways $f\ f$ are mounted upon the respective sides of the conveyer a, and these may be advantageously provided of an angular section with the vertical parts of the section on the inside and oppositely disposed to each other as illustrated in Figure 2 so that thus these upstanding parts of the sections engage on the inner faces of the stereotype plates e near the longitudinal edges and thus serve to guide the stereotype plate as the plate is moved by the conveyer. Where the path of the guide-ways f f has a curvature the conveyer may be compelled to take a corresponding course by means of guides or guide plates in the manner before described.

Figure 1:
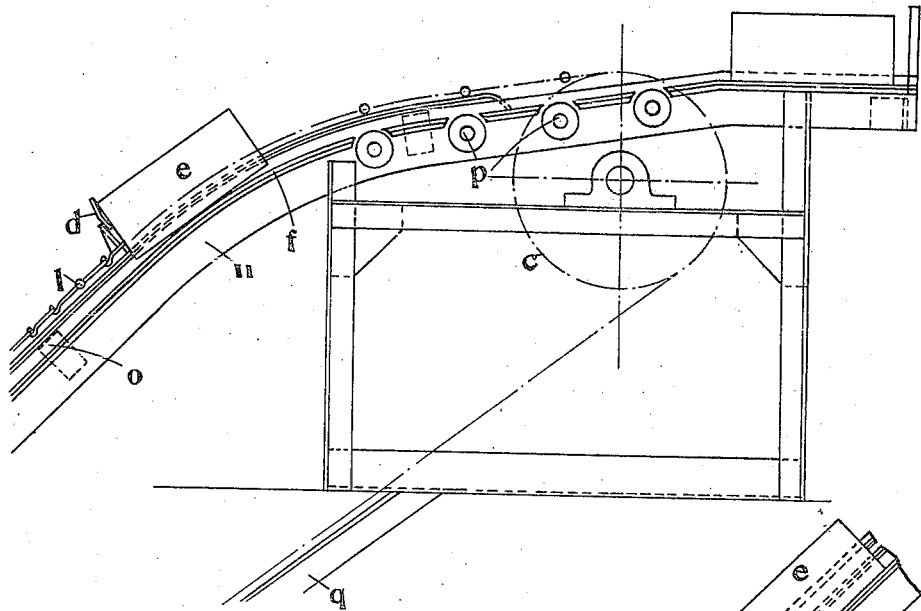
Figure 1 represents the general arrangement of the upper part of an apparatus according to the invention, and Figure 2 the lower part.

As illustrated in the accompanying drawings, the conveyer is formed of a number of links, some of which are formed of two parallel parts such as $a^1$ Figure 3, terminating at one end in hooks $a^2$ and at the other end in a transverse part $a^3$. The transverse part $a^3$ of one link is engaged within the hook of the next adjacent link but certain of the links at intervals instead of being provided with an integral transverse part $a^3$ are provided with a separate transversely disposed pin or spindle $a^4$ at the ends of which rollers h are mounted as illustrated in Figure 3 while centrally between the parallel parts $a^1$ of the links a boss or roller i is mounted. The guide or guide plate k is as illustrated in Figure 1 extended from the position adjacent to the chain wheel b to a position adjacent the chain wheel c and is formed or curved corresponding to the form or curvature of the guide-ways f. The guides l are disposed on each side and above the guide or guide plate k in the relative positions indicated in Figure 3 and the guides l are supported at intervals by means of shallow U-shaped members m secured beneath the guide or guide plate k. It will thus be understood that in the movement of the conveyer guides l compel the conveyer to conform to the curvature in the guide-ways f at the lower part of the apparatus illustrated in Figure 2, while the guide or guide plate k supports it towards the upper end.

It will be understood that the rollers h rotate on the under face of the guides l l and that the edges of the roller i rotate upon the guide or guide plate k. The guide-ways f f are supported upon the frame members n and these in turn serve to support the guide or guide plate k by means of transversely disposed members o provided at intervals. The supporting frame has mounted upon it at its lower and upper ends rollers p by means of which the longitudinal edges of the stereotype plate may roll. The return part of the conveyer a may be supported by means of a downwardly inclined member q as illustrated in Figure 2. It will be understood that the upper and lower parts of the frame may be supported in any suitable manner such as illustrated and may be strengthened or reinforced in positions between.

Such an apparatus may be provided of any inclination or inclinations. It may be made to follow any determined path between the loading and delivery points.

I claim:

1. A conveyer apparatus for the conveyance of stereotype plates, comprising angular guide-ways within which the longitudinal edges of the stereotype plates may slide, and an endless conveyer disposed in position between, said guide-ways with means to engage the plates, substantially as described.

2. A conveyer apparatus for the conveyance of stereotype plates, comprising guide-ways within which the longitudinal edges of the stereotype plates may slide, an endless conveyer disposed in position between the said guide-ways, means for engaging the plates, a centrally disposed guide beneath the said conveyer and lateral guides above and on each side of the said conveyer.

3. A conveyer apparatus for the conveyance of stereotype plates, comprising guide-ways within which the longitudinal edges of the stereotype plates may slide, an endless conveyer disposed in position between the said guide-ways, means for engaging the plates, a centrally disposed guide beneath the said conveyer, lateral guides above and on each side of the said conveyer, and rollers upon the conveyer to contact respectively with the said centrally disposed guide and with the said lateral guides.

4. A conveyer apparatus for the conveyance of stereotype plates, comprising angular guide-ways within which the longitudinal edges of the stereotype plates may slide, an endless conveyer disposed in position between the said guide-ways, upstanding members on the said conveyer to engage one of the ends of the stereotype plates, a centrally disposed guide beneath the said conveyer, lateral guides above and on each side of the said conveyer, transversely disposed spindles on said conveyer, and rollers upon said spindles in position respectively to contact with the said centrally disposed guide and with the said lateral guides.

GEORGE WILLIAM MASCORD.